United States Patent [19]

Fujioka et al.

[11] Patent Number: 5,005,916
[45] Date of Patent: Apr. 9, 1991

[54] ANTILOCK BRAKE CONTROL SYSTEM FOR A MOTORCYCLE

[75] Inventors: Hideaki Fujioka; Yoshio Katayama, both of Itami, Japan

[73] Assignee: Sumitomo Electric Industries, Ltd., Osaka, Japan

[21] Appl. No.: 524,474

[22] Filed: May 17, 1990

[30] Foreign Application Priority Data

May 18, 1989 [JP] Japan .................................. 1-125299

[51] Int. Cl.$^5$ ................................................ B60T 8/60
[52] U.S. Cl. .................................... 303/103; 303/96; 303/100; 303/111; 364/426.02
[58] Field of Search ........... 303/103, 102, 96, DIG. 3, 303/DIG. 4, 95, 98, 100, 104–111; 188/181 C, 181 A, 344; 364/426.01, 426.02

[56] References Cited

U.S. PATENT DOCUMENTS

| | | | |
|---|---|---|---|
| 4,420,191 | 12/1983 | Arikawa et al. | 303/103 |
| 4,762,375 | 8/1988 | Maki et al. | 303/96 |
| 4,787,682 | 11/1988 | Muto | 303/103 X |

Primary Examiner—Douglas C. Butler
Attorney, Agent, or Firm—Cushman, Darby & Cushman

[57] ABSTRACT

An antilock brake control system for a motorcycle having front and rear wheels includes detectors for detecting front and rear wheel velocities, and a calculator for calculating an estimated velocity of the motorcycle. The calculator also calculates a slippage of the front and rear wheels relatively to the estimated motorcycle velocity. The amount of slippage is corrected by a compensation amount determined by the detection of various situations such as presence and absence of antilock control applied to front or rear wheel and presence and absence of brake applied to front or rear wheel.

4 Claims, 5 Drawing Sheets

ANTILOCK BRAKE CONTROL SYSTEM FOR A MOTORCYCLE

BACKGROUND OF THE INVENTION

1. Field of the Invention

The present invention relates to an antilock brake control system for motorcycles, and more particularly, to an antilock brake control system for use in motorcycles on which the front and rear brakes can be separately operated.

2. Description of the Prior Art

Generally, the antilock brake control system equipped in the motorcycle operates such that: the velocity of each wheel and the estimated vehicle velocity are calculated using the wheel velocity sensors installed on the front and rear wheels; the wheel velocity is compared with the estimated vehicle velocity; and a signal causing the brake pressure of the wheel to drop is produced when the wheel velocity becomes less than a specified value, i.e., when the wheel slippage exceeds a predetermined level.

When the brakes are suddenly applied during vehicle travel, excessive slipping of the wheel to which the brake was applied is caused, resulting in a loss of steering stability and a dangerous situation. Therefore, antilock brake control systems which as conventionally proposed detect the generation of excessive slipping or the symptoms thereof, and control and suppress the brake pressure regardless of the degree of brake pedal or brake lever depression.

Ideally, when the difference between the true vehicle velocity and the velocity of each wheel is obtained, this difference expresses the true amount of slipping, and antilock brake control is applied based on this slipping amount. However, detection of the true vehicle velocity requires sophisticated precision machinery, which is not used in conventional antilock brake control systems due to the size and cost thereof, and the estimated vehicle velocity as estimated from the velocity of each wheel is therefore used.

In other words, the antilock brake control systems of this type operates such that: the wheel velocity of each wheel is calculated from the detection signals output from the wheel velocity sensor mounted at each wheel; the estimated vehicle velocity is calculated from each wheel velocity; the estimated vehicle velocity is compared with each wheel velocity; and when a wheel velocity becomes less than the estimated vehicle velocity by a predefined amount, i.e., the slipping index becomes greater than a predetermined value, it is determined that the wheels have a tendency to lock and an antilock signal is generated to lower the brake pressure of that wheel.

When the above-mentioned antilock brake control system is installed on a motorcycle, because the brakes on the front and rear wheels can be independently operated, the deviation of the estimated vehicle velocity from the actual vehicle velocity fluctuates greatly between those cases in which the brakes are applied to both wheels and when the brakes are applied to only one wheel.

For examples, as shown in FIG. 1, when the brakes are not applied to the front wheel, the front wheel has virtually no slipping with respect to the road surface, and accordingly, the estimated vehicle velocity (the single dot-dash line) obtained from the velocity of the front wheel is almost identical to the actual vehicle velocity (solid line). On the other hand, when the front brakes are applied, the front wheel slips on the road surface, and the estimated vehicle velocity (the dotted line) obtained from the velocity of the front wheel is significantly less than the actual vehicle velocity.

Focusing on this tendency, an improved antilock brake control circuit is proposed and is disclosed, for example, in U.S. Pat. No. 4,420,191 (corresponding to Japanese Patent Publication 61-28539). According U.S. Pat. No. 4,420,191, the control circuit switches, for a given period of time after the wheel deceleration of one wheel becomes greater than a predetermined value and it is detected that the brakes are sufficiently applied, to a a greater value with which the velocity of this wheel is compared for carrying out the slip detection of the other wheel.

Thus, according to the control circuit of U.S. Pat. No. 4,420,191, the antilock brake control for the rear wheel is carried out in the same manner, for a given amount of rear wheel slippage, regardlessly of the brakes applied to the front wheel.

However, the following problems arise in the above described antilock brake control system for motorcycles, because the detection of the front brake condition only occurs after the brakes are sufficiently applied.

When the front brakes are applied but are applied slowly, it may happen that the front wheel brake condition remains undetected and front wheel control is not applied. In a case like this, the estimated vehicle velocity obtained from the wheel velocity of the front wheel deviates from the actual vehicle velocity and is shown to be less than the actual (single dot-dash line in FIG. 2). However, because it is assumed that the brakes are not applied to the front wheel, the threshold set for rear wheel control is set at a value (threshold TH2) with a large deviation $\Delta 2$ from the estimated vehicle velocity, a level less than the level (threshold TH1) which should normally be set. Therefore, the antilock brake control is applied to the rear wheel after locking of the rear wheel has significantly advanced, thus resulting in greater than necessary slipping and the inability to maintain stable control.

Note that the preceding description considers control of the rear wheel based on the front wheel, but the same problem arises when front wheel control is based on the rear wheel.

SUMMARY OF THE INVENTION

Therefore, the object of the present invention is to provide an antilock brake control system for motorcycles which can eliminate the above described problems; and can provide appropriate antilock brake control for both cases in which the front or rear brake is applied slowly.

In order to achieve the aforementioned object, an antilock brake control system for a motorcycle having front and rear wheels, according to the present invention comprises means for detecting a velocity of the front wheel, means for detecting a velocity of the rear wheel, means for calculating an estimated velocity of the motorcycle based on the detected front and rear wheel velocities, means for calculating a slippage of the front and rear wheels relatively to the estimated motorcycle velocity, means for detecting a brake applied to the front wheel, means for detecting a brake applied to the rear wheel, means for providing antilock control to the front wheel, means for providing antilock control to the rear wheel, means for detecting whether or not one of the front and real wheel is provided with antilock control, means for detecting whether or not one of the front and real wheel is applied with brake, and means for producing compensation amounts for compensating the slippage when each of the front and rear wheels is provided with antilock control.

Because those cases in which the brakes can be applied to some degree without evidencing any locking symptoms and in which the brakes can be applied strongly and locking symptoms are evidenced can be distinguished and different control applied accordingly, that problem in which the start of antilock control is inhibited and is only applied after locking has advanced significantly is eliminated, and it is possible to apply appropriate antilock brake control according to various situations.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENT

Figure 1:
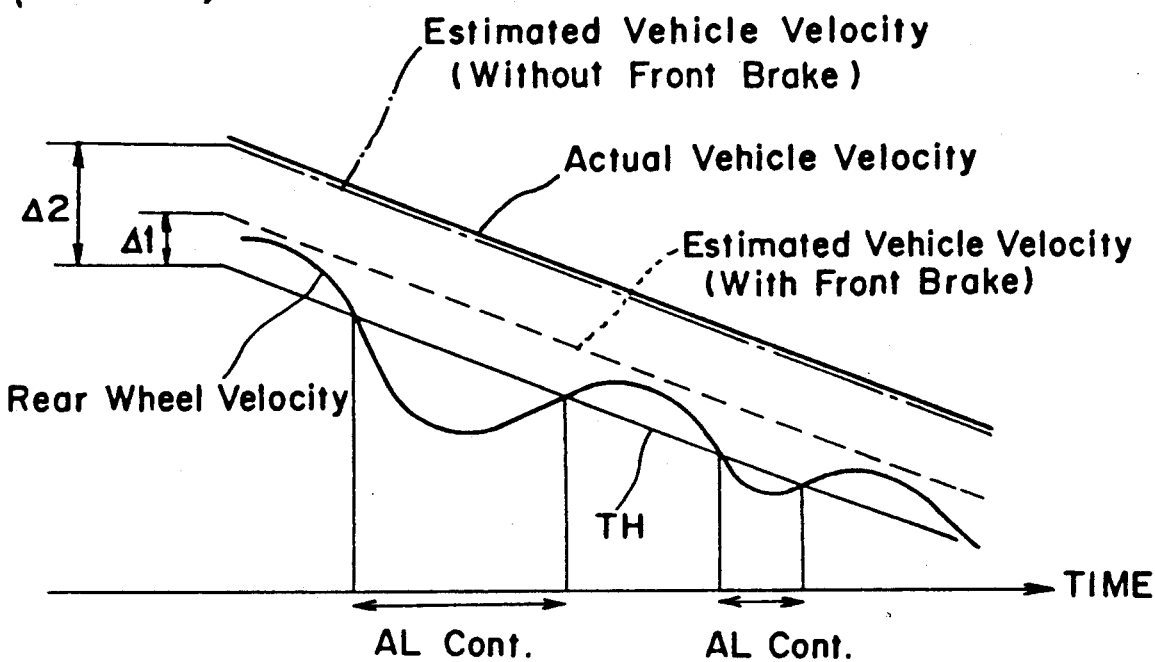
FIG. 1 and FIG. 2 are graphs showing the threshold of the wheel velocity at which antilock brake control is applied in a conventional antilock brake control system.
Figure 2:
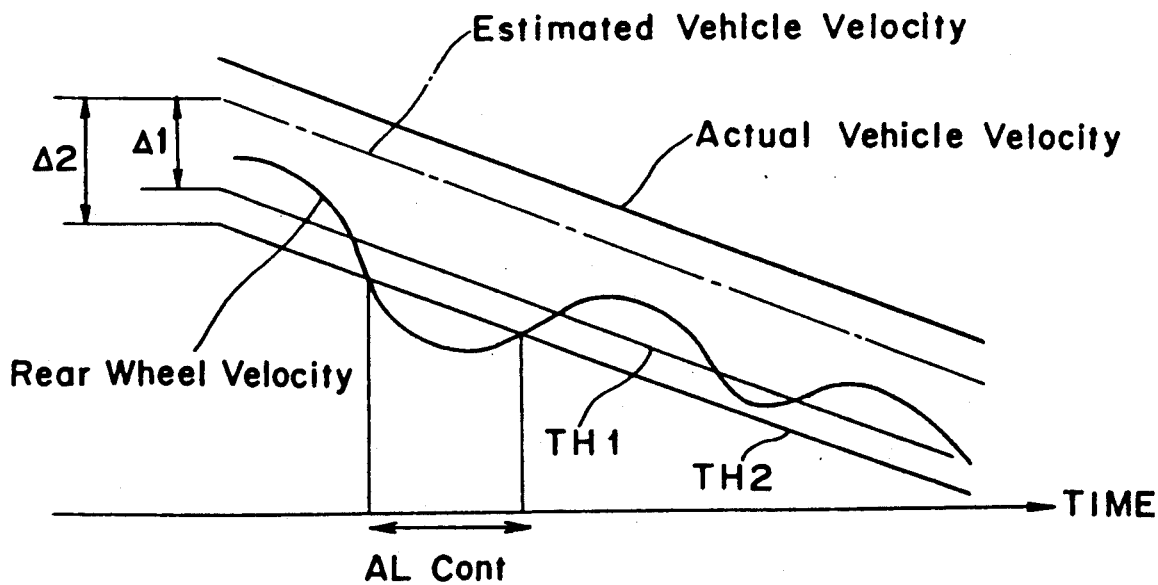
Figure 3:
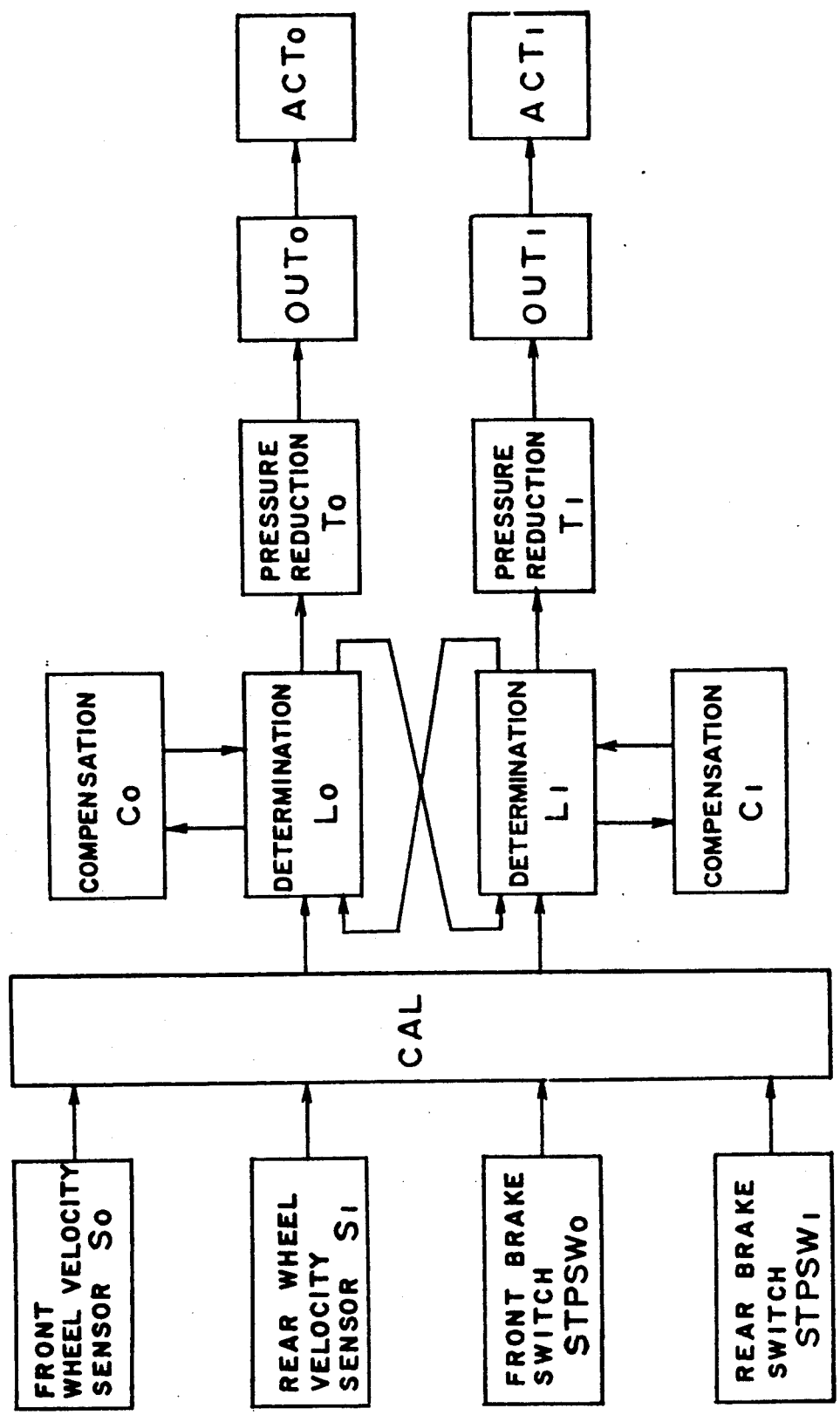
FIG. 3 is a block diagram of an antilock brake control system according to the present invention.

Referring to FIG. 3, a block diagram of the antilock brake control system for motorcycles according to one embodiment of the present invention is shown. In FIG. 3, reference numbers S0 and S1 (0 for the front wheel, 1 for the rear wheel, hereinafter the same) are the sensors which detect the wheel velocity of the front and rear wheels, respectively; STPSW0 and STPSW1 are the brake switches for the front wheel and rear wheel, respectively, and which, for example, are used to turn the brake lights on. CAL is an arithmetic unit which computes the wheel velocity $SPEEDi$ of each wheel, the estimated vehicle velocity VREF, and the wheel deceleration $DECELi$ for each wheel.

L0 and L1 are determination circuits which use the result from the arithmetic unit to determine whether or not antilock brake control is necessary.

For example,
if
$SPEEDi \leq STHR$
and
$DECELi \leq DTHR$ wherein STHR is the speed threshold and DTHR is the wheel deceleration threshold, locking is determined to have occurred and a signal enabling antilock brake control is output from the determination circuit Li.

Note that in order to determine whether antilock brake control is being carried out in the other wheel, the output from determination circuit L0 is added to determination circuit L1, and the output of determination circuit L1 is also added to determination circuit L0.

C0 and C1 are slippage compensation operators which calculate the amount of slippage for each wheel and compensate the calculated result. T0 and T1 are setting circuits which set the pressure reduction time to reduce the brake pressure in order to cancel wheel locking when it is determined that antilock brake control is necessary; OUT0 and OUT1 are output circuits which output a predetermined pressure reduction pulse according to the set pressure reduction time. ACT0 and ACT1 are actuators for the solenoids which accomplish the actual pressure reduction.

Figure 4A:
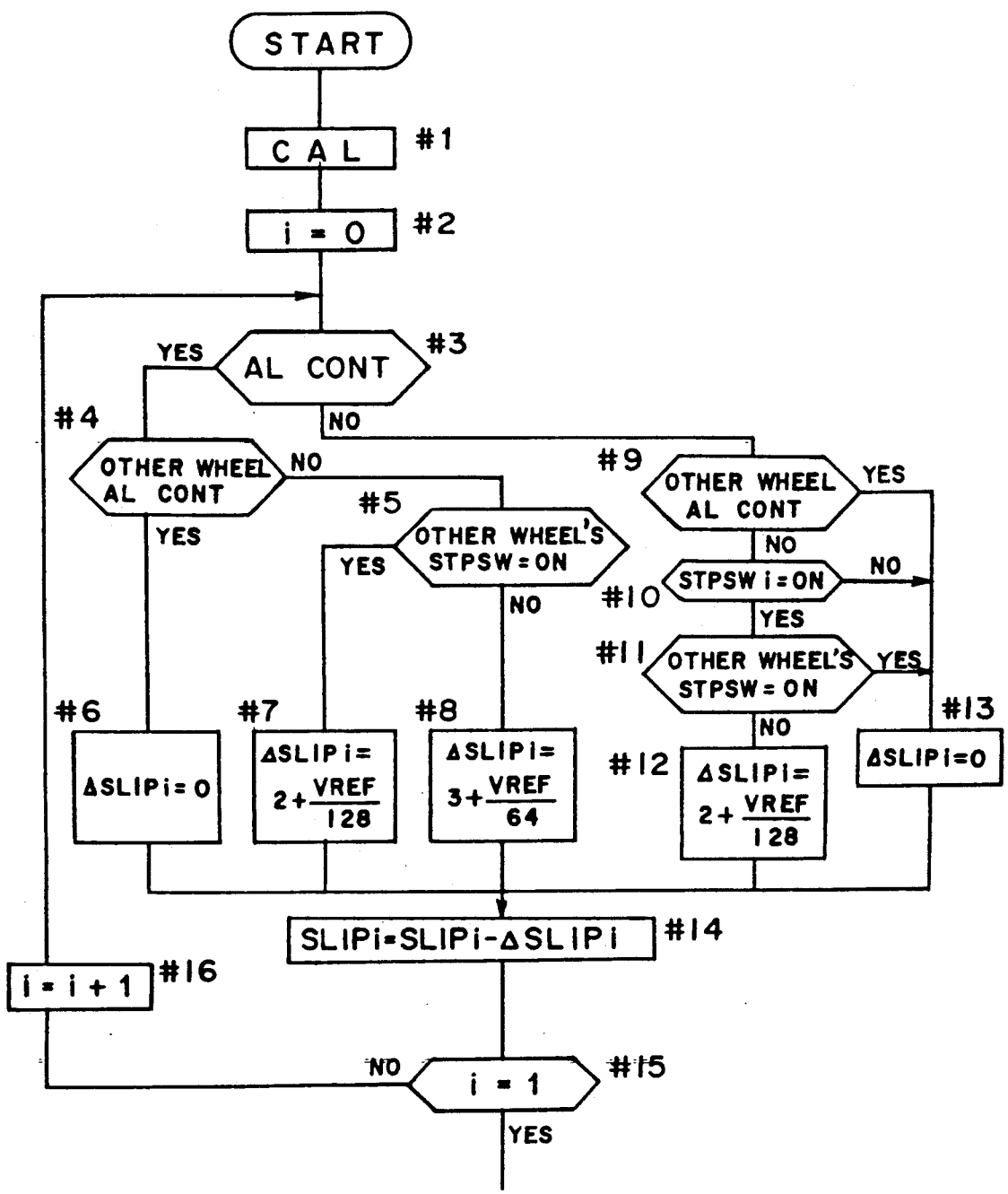
FIGS. 4, 4a and 4b are flow chart explaining the operation of an antilock brake control system according to the present invention.
Figure 4:
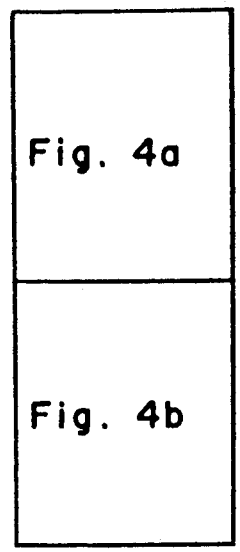
Figure 4B:
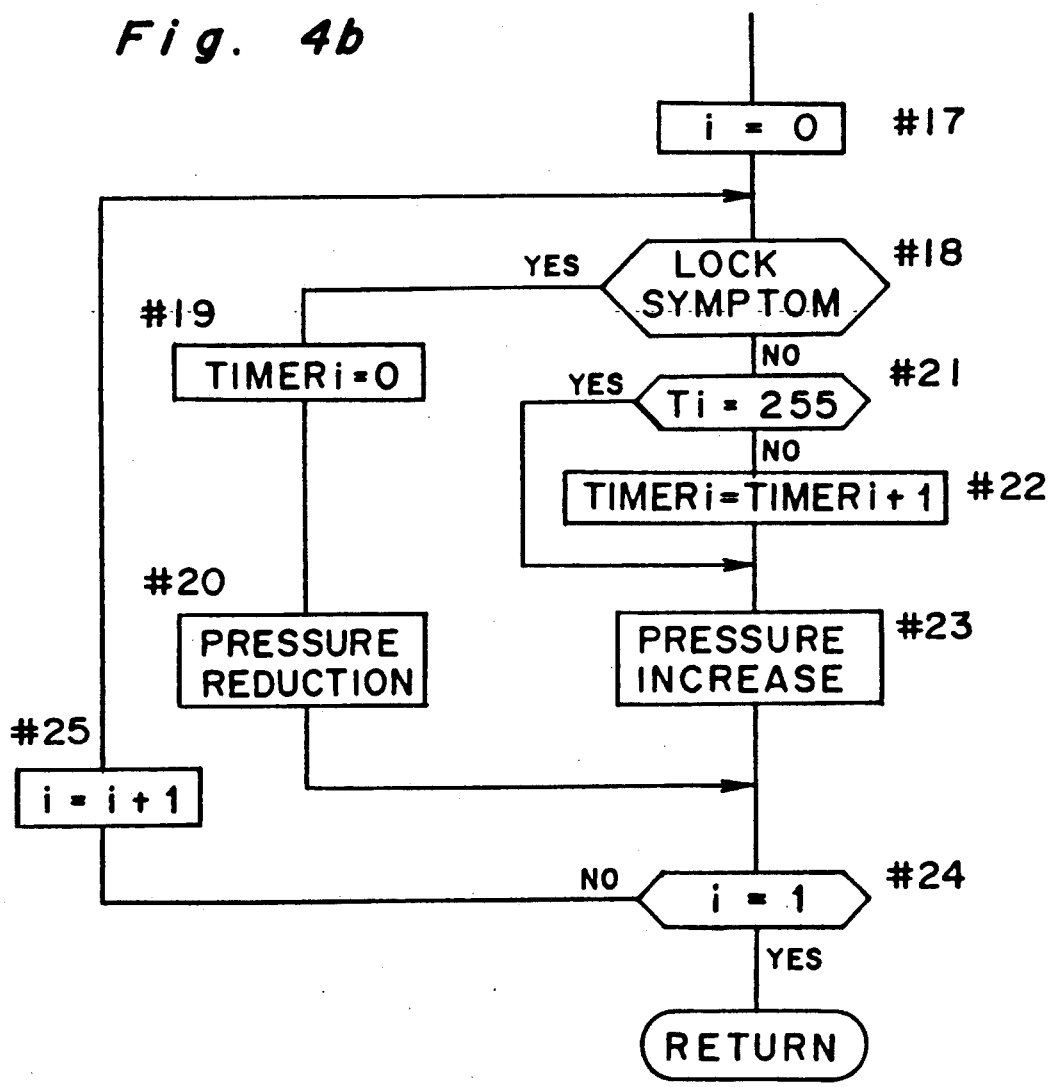

The operation of the antilock brake control system for motorcycles comprised as described hereinabove is described hereinbelow with reference to the flow chart in FIG. 4.

At step #1, the velocity $SPEEDi$ of each wheel, the estimated vehicle velocity VREF, and the deceleration $DECELi$ of each wheel are calculated by the arithmetic unit CAL, and the on/off state of brake switches STPSW0 and STPSW1 is determined.

At step #2, i representing front or rear wheel is initialized to i=0, so that the need for antilock brake control for the front wheel is determined.

At step #3, it is determined whether antilock brake control is being carried out in the front wheel. As will be described hereinbelow, this determination is made by evaluating whether the count of timer T0 for the front wheel is equal to a predefined value, e.g., 255, and it is determined that antilock brake control is being carried out if the count is less than 255, and is not being carried out if the count is equal to 255.

If at step #3 it is determined that one wheel, e.g., the front wheel, is under antilock brake control, it is similarly determined at step #4 whether antilock brake control is being carried out for the other wheel, e.g., the rear wheel. If the rear wheel is also under antilock brake control, the procedure advances to step #6 where the slip compensation $\Delta SLIPi$ is set to 0. In other words, no slip compensation is applied in this case because antilock brake control is being carried out for both the front and rear wheels.

However, if at step #4 it is determined that the other wheel is not under antilock brake control, the procedure advances to step #5, where it is determined whether the brake switch STPSW for the other wheel, e.g., the rear wheel, is on or off. If it is on, the procedure advances to step #7 in which the slip compensation amount $\Delta SLIPi$ is set to the following amount $$\Delta SLIPi = 2 + (VREF/128)$$

wherein a unit for 2 is 1.1/4 km/h and VREF is the estimated vehicle velocity. If it is detected as off at step #5, the procedure advances to step #8 where the slip compensation amount $\Delta SLIPi$ is set to the following amount $$\Delta SLIPi = 3 + (VREF/64).$$

Figure 5:
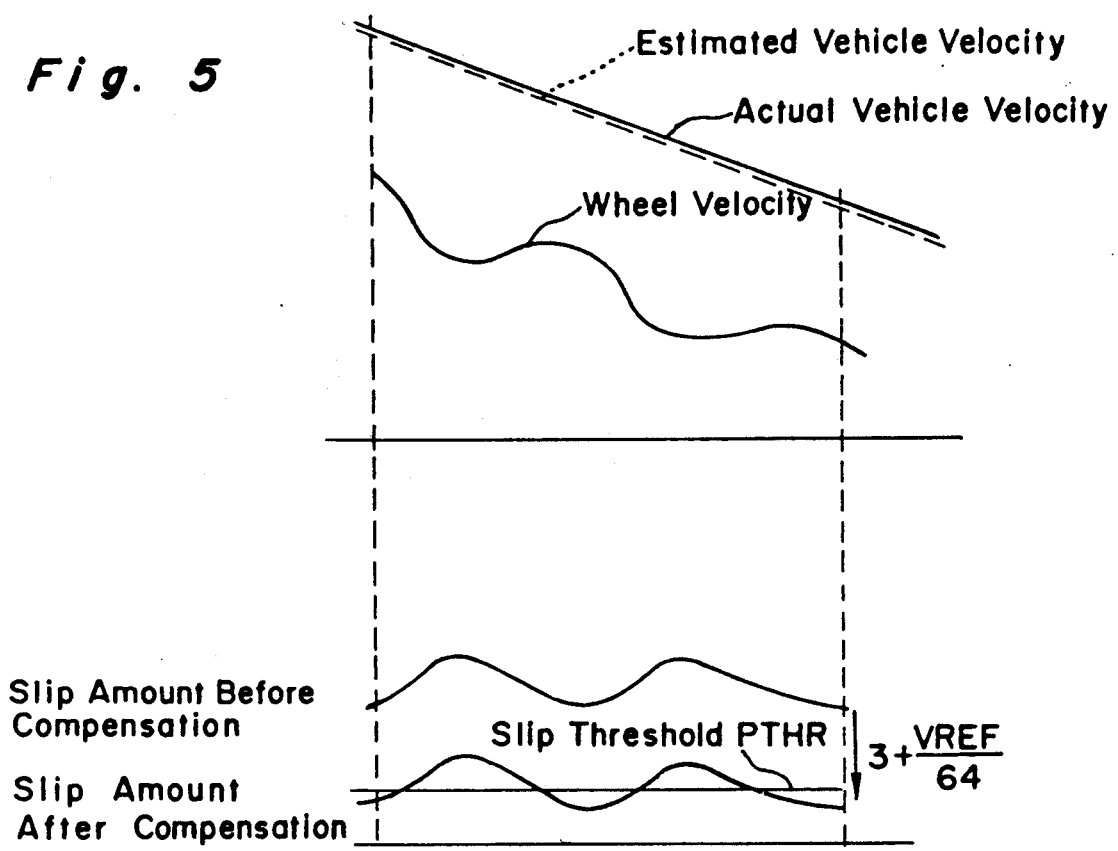
FIG. 5 and FIG. 6 are graphs showing the before and after state of compensation for the slippage amount at which antilock brake control is applied in an antilock brake control system according to the present invention.

In other words, in the event of step #8, because antilock brake control is being carried out in the front wheel and no control is carried out in the rear wheel, the estimated vehicle velocity obtained from the rear wheel (shown by the dotted line in FIG. 5) can be considered to be approximately equal to the true vehicle velocity (shown by the solid line in FIG. 5). Therefore, because the difference (i.e., the slippage) between the wheel velocity of the front wheel, for which antilock brake control is executed, and the rear wheel is a large value, the slippage is compensated (step #14) to a smaller value using the compensation amount $\{3+(VREF/64)\}$.

Figure 6:
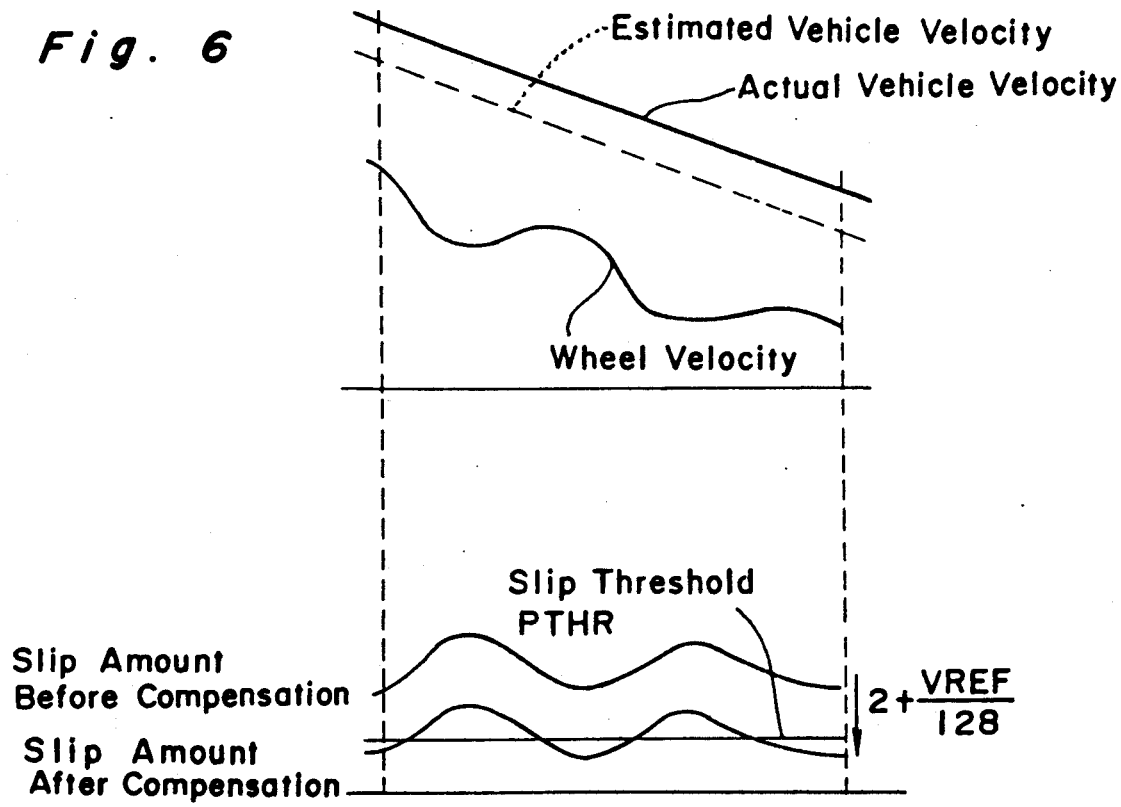

On the other hand at step #7, because antilock brake control is being carried out for the front wheel and the brakes are being applied to the rear wheel, the estimated vehicle velocity obtained from the rear wheel velocity (shown by the dotted line in FIG. 6) is slightly less than the true vehicle velocity (shown by the solid line in FIG. 6). Therefore, the difference between the wheel velocity of the front wheel, to which antilock brake control is applied, and the rear wheel, to which the brakes are applied, i.e., the amount of slipping, is a slightly high value, and the slippage is compensated (step #14) to a smaller value using the slightly high compensation level $\{2+(VREF/128)\}$.

If at step #3 it is determined that the front wheel is not under antilock brake control, it is determined at step #9 whether the other wheel, e.g., the rear wheel, is under antilock brake control. If the rear wheel is under antilock brake control, the procedure advances to step #13 and the slip compensation $\Delta SLIPi$ is set to 0. Furthermore, if the rear wheel is not under antilock brake control, it is determined at step #10 whether the wheel currently being examined, i.e., the front wheel, brake switch STPSW is on or off. If it is on, the procedure advances to step #11 where it is determined whether the brake switch STPSW for the other wheel (rear wheel) is on or off. If it is off, the procedure advances to step #12 where the slip compensation $\Delta SLIPi$ is set to $\{2+(VREF/128)\}$.

If the result of step #10 is NO, or if the result of step #11 is YES (i.e., if the front wheel brake switch STPSW is off, or if the brake switches STPSW for both the front wheel and the rear wheel are on), the procedure advances to step #13 where the slip compensation $\Delta SLIPi$ is set to 0.

Thus, once the slip compensation is set, the procedure advances to step #14 where compensation for the slippage is applied based on the formula:
$SLIPi = SLIPi - \Delta SLIPi$ Next at step #15, it is determined whether i=0 (front wheel) or i=1(rear wheel). If i=0 (front wheel), the procedure advances to step #16 where i is set to 1 (rear wheel); this same differentiation is applied to the rear wheel, thus setting the slippage compensation for each case.

If all cases for which compensation may be applied as described above are listed, the following table will result.

TABLE 1

| Antilock brake control | | STOP SW | | | |
|---|---|---|---|---|---|
| FW | RW | FW | RW | $\Delta SLIPi$ | i |
| o | x | — | off | 3 + (VREF/64) | 0 |
| o | x | — | on | 2 + (VREF/128) | 0 |
| x | o | off | — | 3 + (VREF/64) | 1 |
| x | o | on | — | 2 + (VREF/128) | 1 |
| x | x | on | off | 2 + (VREF/128) | 0 |
| x | x | off | on | 2 + (VREF/128) | 1 |
| All other cases | | | | 0 | | wherein:
x = antilock brake control not applied
o = antilock brake control is being applied
VREF = estimated vehicle velocity
unit = 1.1 km/h Next at step #17, i is set to i=0 (front wheel), and antilock brake control is applied to the front wheel.

First, at step #18, the presence of locking symptoms are detected. The locking symptom detection method may be such that the locking symptoms are determined to be present when the compensated slippage is greater than a predetermined slippage threshold PTHR and, at the same time, the wheel deceleration is greater than a predetermined threshold DTHR, but other known methods may also be used. When locking symptoms are detected, the antilock timer TIMERi is cleared at step #19, and a pressure reduction command is output at step #20. However, if locking symptoms are not detected, it is determined at step #21 whether the antilock timer TIMERi has reached the upper limit 255 or not; if it has not, the antilock timer is incremented (step #22), and a pressure increase command is output at the next step #23.

Next at steps #24 and #25, i is set to i=1, and the same procedure is executed for antilock brake control with the rear wheel.

According to the antilock brake control system of the present invention, since slippage compensation is set individually for each wheel according to whether or not the front and/or rear wheel is under antilock brake control and whether the brake switch for the front and/or rear wheel is on or off, and since antilock brake control is applied using the amount of slippage after compensation, it is possible to execute control differently for those cases in which the brakes are applied to some degree but locking symptoms are not evidenced and those cases in which the brakes are applied strongly and locking symptoms are evidenced. Therefore, the problem in which the start of antilock brake control is inhibited and is only applied after locking becomes advanced is eliminated, and antilock brake control can be executed with an appropriate degree of locking for various cases.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:
1. An antilock brake control system for a motorcycle having front and rear wheels, comprising:
means for detecting a velocity of said front wheel;
means for detecting a velocity of said rear wheel;

means for calculating an estimated velocity of said motorcycle based on the detected front and rear wheel velocities;

means for calculating a slippage of said front and rear wheels relatively to the estimated motorcycle velocity;

means for detecting a brake applied to said front wheel;

means for detecting a brake applied to said rear wheel;

means for providing antilock control to said front wheel;

means for providing antilock control to said rear wheel;

means for detecting whether or not one of said front and rear wheel is provided with antilock control;

means for detecting whether or not one of said front and rear wheel is applied with brake; and means for producing compensation amounts for compensating said slippage when each of said front and rear wheels is provided with antilock control.

2. An antilock brake control system for a motorcycle as claimed in claim 1, wherein said compensation amount producing means produces a first compensation amount when one of said front and rear wheel is provided with antilock control and, at the same time, the wheel not provided with antilock control is not applied with brake.

3. An antilock brake control system for a motorcycle as claimed in claim 1, wherein said compensation amount producing means produces a second compensation amount when one of said front and rear wheel is provided with antilock control and, at the same time, the wheel not provided with antilock control is applied with brake.

4. An antilock brake control system for a motorcycle as claimed in claim 1, wherein said compensation amount producing means further produces compensation amounts for compensating said slippage when neither of said front and rear wheels is provided with antilock control and at the same time, either of said front and rear wheels is applied with brake.

* * * * *